US009884603B2

(12) United States Patent
Kim et al.

(10) Patent No.: US 9,884,603 B2
(45) Date of Patent: Feb. 6, 2018

(54) STEERING WHEEL AIRBAG APPARATUS (71) Applicant: HYUNDAI MOBIS CO., LTD., Seoul (KR)

(72) Inventors: Do Hyoung Kim, Yongin-si (KR); Seok Hoon Ko, Yongin-si (KR); Hae Kwon Park, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 15/211,908

(22) Filed: Jul. 15, 2016

(65) Prior Publication Data
US 2017/0021792 A1 Jan. 26, 2017

(30) Foreign Application Priority Data
Jul. 22, 2015 (KR) .................. 10-2015-0103979

(51) Int. Cl.
*B60R 21/203* (2006.01)
*B60Q 5/00* (2006.01)

(52) U.S. Cl.
CPC ............ *B60R 21/203* (2013.01); *B60Q 5/003* (2013.01); *B60R 21/2037* (2013.01)

(58) Field of Classification Search
CPC ............. B60R 21/203; B60R 21/2037; B60R 21/21658; B60Q 5/003
See application file for complete search history.

(56) References Cited

U.S. PATENT DOCUMENTS

| 4,785,144 | A | * | 11/1988 | Fosnaugh | B60Q 5/003 200/61.55 |
| 5,239,147 | A | * | 8/1993 | Allard | B60Q 5/003 200/61.54 |
| 5,303,952 | A | * | 4/1994 | Shermetaro | B60Q 1/0082 200/61.55 |
| 5,410,114 | A | * | 4/1995 | Furuie | B60Q 5/003 200/61.55 |
| 5,593,178 | A | * | 1/1997 | Shiga | B60Q 5/003 200/61.55 |
| 6,474,682 | B2 | * | 11/2002 | Ikeda | B60Q 5/003 200/61.55 |
| 6,508,485 | B2 | * | 1/2003 | Kikuta | B60R 21/2037 200/61.54 |
| 6,616,180 | B2 | * | 9/2003 | Schutz | B60Q 5/003 200/61.55 |
| 6,874,808 | B2 | * | 4/2005 | Marath | B60R 21/2037 280/728.2 |

(Continued)

FOREIGN PATENT DOCUMENTS

KR 10-2007-0060482 A 6/2007

*Primary Examiner* — Laura Freedman
(74) *Attorney, Agent, or Firm* — Knobbe Martens Olson & Bear LLP (57) ABSTRACT

A steering wheel airbag apparatus may include: a mounting plate seated on a wheel armature, and having a guide pipe formed therein; a cover coupled to the mounting plate; a moving contact module movably installed in the guide pipe, pressurized and moved by the cover, and connected to a positive electrode; and an elastic contact portion coupled to the guide pipe, connected to a negative electrode while supported by the negatively charged wheel armature, and connected to the moving contact module as the moving contact module is moved.

11 Claims, 7 Drawing Sheets

(56) References Cited

U.S. PATENT DOCUMENTS

| | | | |
|---|---|---|---|
| 7,464,959 B2 * | 12/2008 | Pillsbury, IV | B60Q 5/003 200/61.55 |
| 7,823,908 B2 * | 11/2010 | Matsu | B60R 21/2037 280/728.2 |
| 9,120,453 B2 * | 9/2015 | Obayashi | B62D 7/222 |

* cited by examiner

STEERING WHEEL AIRBAG APPARATUS

CROSS-REFERENCES TO RELATED APPLICATIONS

The present application claims priority to Korean application number 10-2015-0103979, filed on Jul. 22, 2015, which is incorporated by reference in its entirety.

BACKGROUND

The present disclosure relates to a steering wheel airbag apparatus, and more particularly, to a steering wheel airbag apparatus capable of reducing the number of parts and the weight of a vehicle.

In general, a vehicle includes a plurality of airbags installed therein. The steering wheel of the vehicle also includes one of the airbags installed therein and further includes a horn. The steering wheel may include many parts or components which may increase the weight of the vehicle. Thus, there is a demand for a structure capable of solving such a problem.

The related art is disclosed in Korean Patent Publication No. 2007-0060482 published on Jun. 13, 2007 and entitled "Cable-type horn switch apparatus".

SUMMARY

Embodiments of the present invention are directed to a steering wheel airbag apparatus capable of reducing the number of parts and the weight of a vehicle.

In one embodiment, a steering wheel airbag apparatus may include: a mounting plate seated on a wheel armature, and having a guide pipe formed therein; a cover coupled to the mounting plate; a moving contact module movably installed in the guide pipe, pressurized and moved by the cover, and connected to a positive electrode; and an elastic contact portion coupled to the guide pipe, connected to a negative electrode while supported by the negatively charged wheel armature, and connected to the moving contact module as the moving contact module is moved.

The moving contact module may include: a moving guide movably arranged in the guide pipe and pressurized by the cover; a moving rod coupled to the moving guide, and connected to the elastic contact portion as the moving guide is moved by the pressurization of the cover; and an elastic member of which both sides are supported by the moving guide and the mounting plate, and which applies an elastic force to the moving guide in the direction where the moving guide is isolated from the elastic contact portion.

The moving guide may include: a cylindrical body portion into which the moving rod and the elastic member are inserted; and guide pin portions extended in parallel to the moving rod in the cylindrical body portion.

The guide pin portions may be arranged at even intervals along the circumferential direction of the cylindrical body portion, and bent toward the center when the cylindrical body portion is inserted into the guide pipe.

The moving guide, the moving rod and the elastic member may be formed of a conductive material, and the elastic member may be connected to a positive wire.

The positive wire may be insert-molded in the mounting plate, and the positive wire may be connected to the elastic member through the guide pipe.

The guide pipe may have a communication pipe formed therein, the communication pipe supporting one side of the elastic member, one side of the moving rod may be passed through the communication pipe, and the elastic contact portion may be installed in the communication pipe.

The communication pipe may have a fixing rib to which the elastic contact portion is fitted.

The elastic contact portion may include: a support panel coupled to the guide pipe so as to support the mounting plate; and an elastic panel inclined and extended toward the wheel armature from the support panel, supported by the wheel armature, and connected to the wheel armature.

The support panel may have restriction ribs formed at both sides thereof, respectively, the restriction ribs being inserted and fixed to the communication pipe and the mounting plate.

The cover may have a pressurizing boss which is inserted to the guide pipe and pressurizes the moving contact module.

DESCRIPTION OF EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

In one example of a steering wheel, an airbag of the steering wheel is housed in a mounting plate, and a cover is coupled to the top of the mounting plate. The mounting plate includes a negative wire and a positive wire which are insert-molded. Furthermore, the mounting plate includes a separation elastic member installed at the bottom thereof, and the separating elastic member slightly pushes the mounting plate upward when the mounting plate is separated from a wheel armature. When a driver presses the cover, the cover is slightly lowered to electrically connect the negative wire and the positive wire. As the negative wire and the positive wire are connected to each other, a horn is operated.

In the above steering wheel, however, since the negative wire and the positive wire are insert-molded in the mounting plate, a connector for connecting the wires to the mounting plate and the cover may be installed. Therefore, the structure of the mounting plate and the cover may become complex. Since the separation elastic member is separately installed at the bottom of the mounting plate, the number of parts and the weight of the vehicle may be increased.

Figure 1:
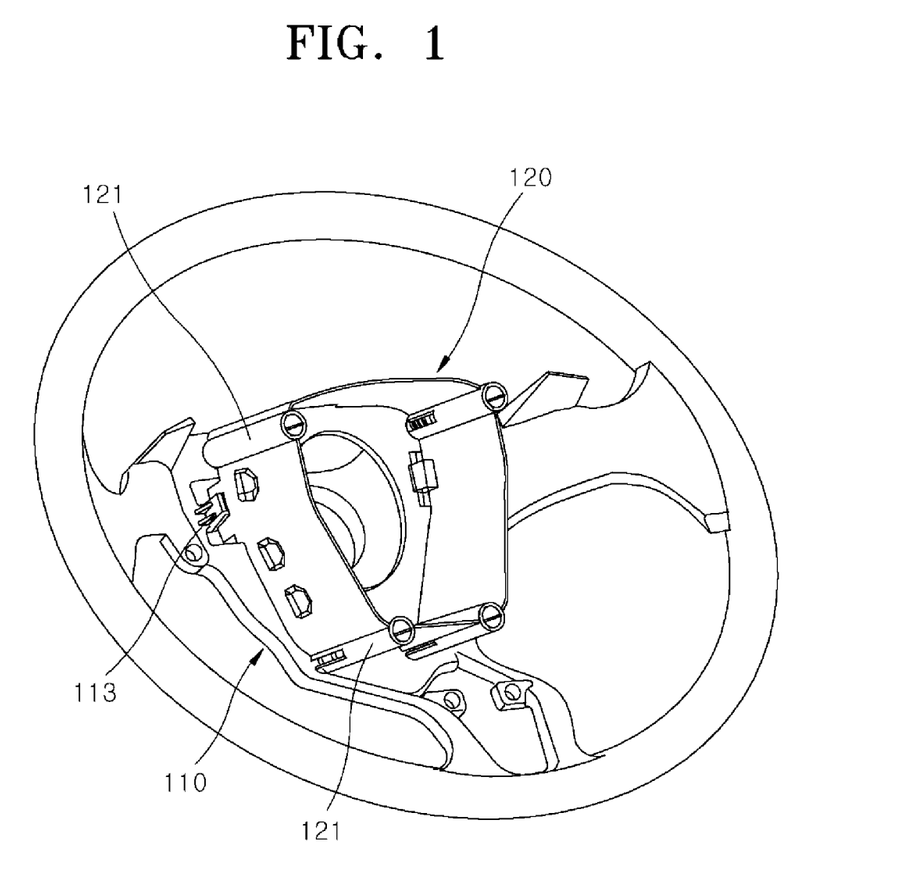
FIG. 1 is a perspective view of a steering wheel airbag apparatus in accordance with an embodiment of the present invention.
Figure 2:
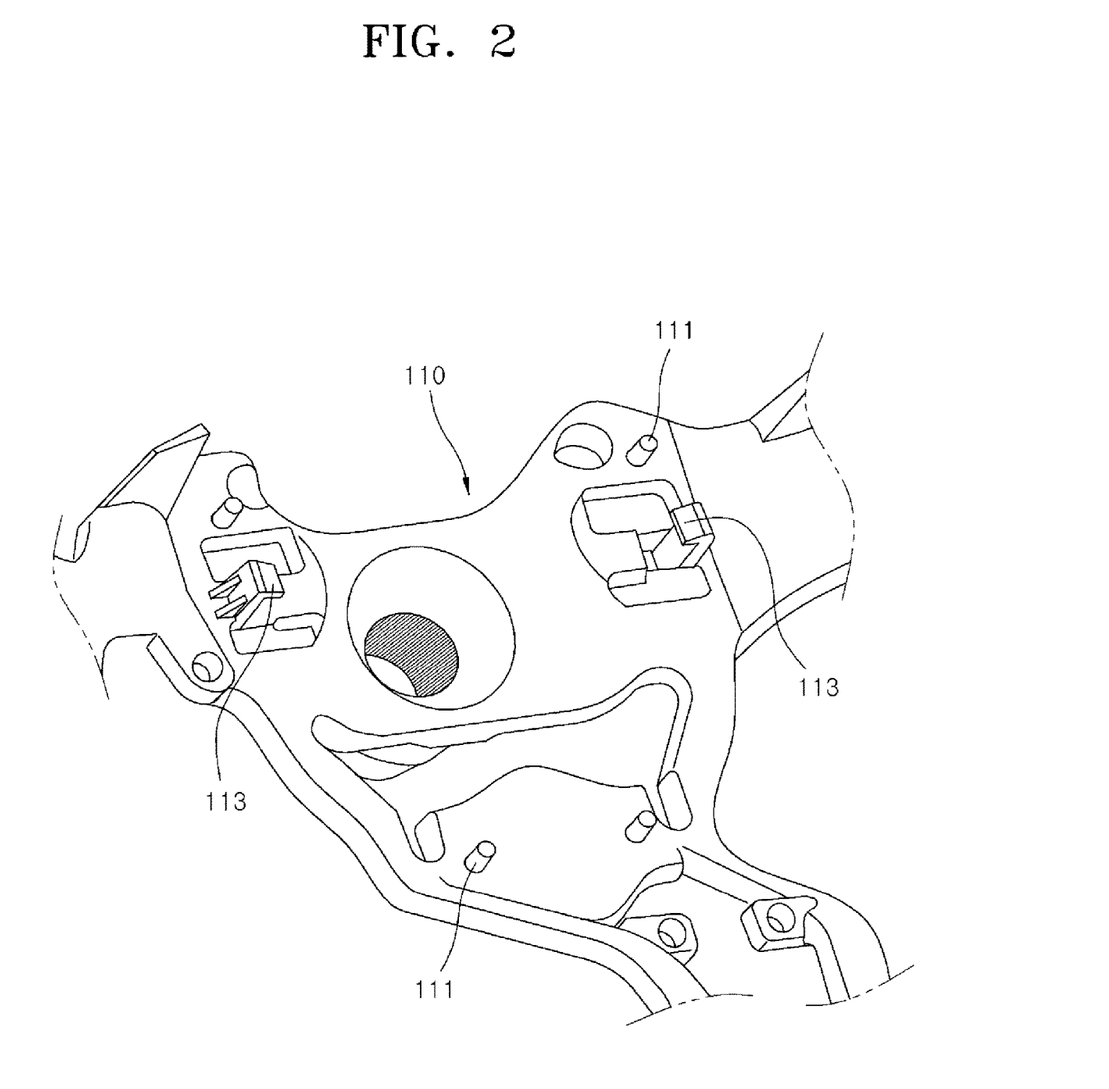
FIG. 2 is a perspective view of a wheel armature in the steering wheel airbag apparatus in accordance with the embodiment of the present invention.
Figure 3:
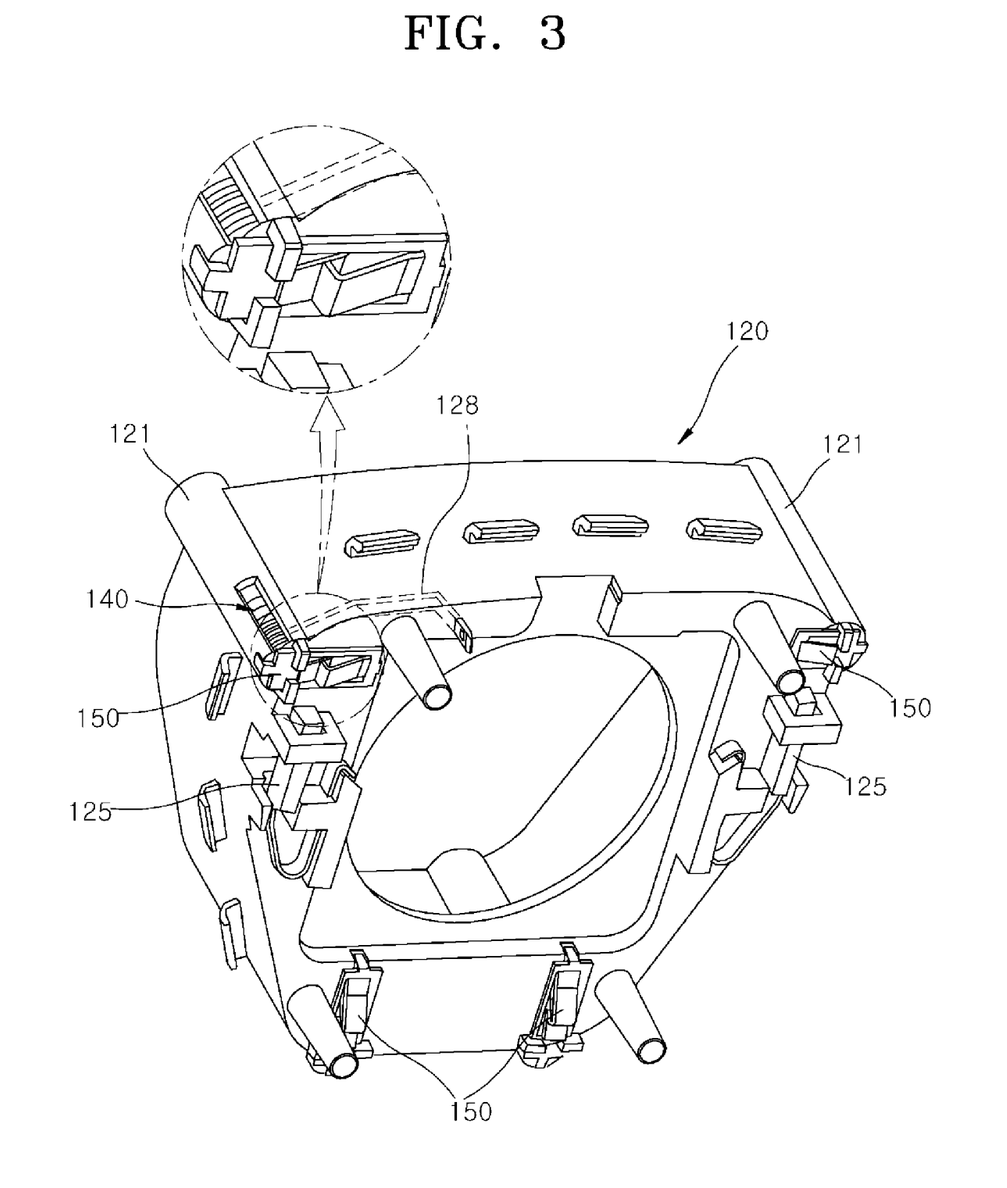
FIG. 3 is a perspective view of a mounting plate in the steering wheel airbag apparatus in accordance with the embodiment of the present invention.

FIG. 1 is a perspective view of a steering wheel airbag apparatus in accordance with an embodiment of the present invention, FIG. 2 is a perspective view of a wheel armature in the steering wheel airbag apparatus in accordance with the embodiment of the present invention, and FIG. 3 is a perspective view of a mounting plate in the steering wheel airbag apparatus in accordance with the embodiment of the present invention.

Referring to FIGS. 1 to 3, the steering wheel airbag apparatus in accordance with the embodiment of the present invention may include a mounting plate 120, a cover 130, a moving contact module 140 and an elastic contact portion 150.

The mounting plate 120 may house an airbag folded therein. The mounting plate 120 may be seated on the wheel armature 110. The mounting plate 120 may have a guide pipe 121 formed at the circumference thereof. The guide pipe 121 may be elongated in the vertical direction. The mounting plate 120 may include a plurality of guide pipes 121. FIGS. 1 and 3 illustrate the mounting plate 120 including four guide pipes 121 formed therein.

The wheel armature 110 may have a plurality of armature bosses for supporting the bottom of the mounting plate 120. At this time, the plurality of armature bosses 111 may be formed on the wheel armature 110 so as to stably support the bottom of the mounting plate 120. The wheel armature 110 and the armature boss 111 may include a conductive material such as magnesium. Since the wheel armature 110 is grounded to a negative electrode, the wheel armature 110 and the armature boss 111 may be negatively charged.

The wheel armature 110 may have a hook portion 113 which is coupled to a restriction portion 125 of the mounting plate 120. The hook portion 113 may restrict the mounting plate 120 from being moved by the armature. The restriction portion 125 of the mounting plate 120 may include a clip which is detachably inserted into the mounting plate 120. The wheel armature 110 may include a plurality of hook portions 113 installed thereon.

The cover 130 may be coupled to the top of the mounting plate 120. The cover 130 may be coupled to the mounting plate 120 so as to move in the vertical direction. At this time, a motion limiting protrusion 126 (refer to FIGS. 6 and 7) may be formed on the outer circumference of the mounting plate 120, and a motion limiting hole 135 (refer to FIGS. 6 and 7) may be formed at the circumference of the cover 130 such that the motion limiting protrusion 126 is inserted into the motion limiting hole 135 so as to limit the moving distance of the cover 130 in the vertical direction. When the cover 130 is moved in the vertical direction, the motion limiting protrusion 126 may be locked to the motion limiting hole 135 and moved only in the motion limiting hole 135, thereby limiting the moving distance of the cover 130 in the vertical direction.

Figure 4:
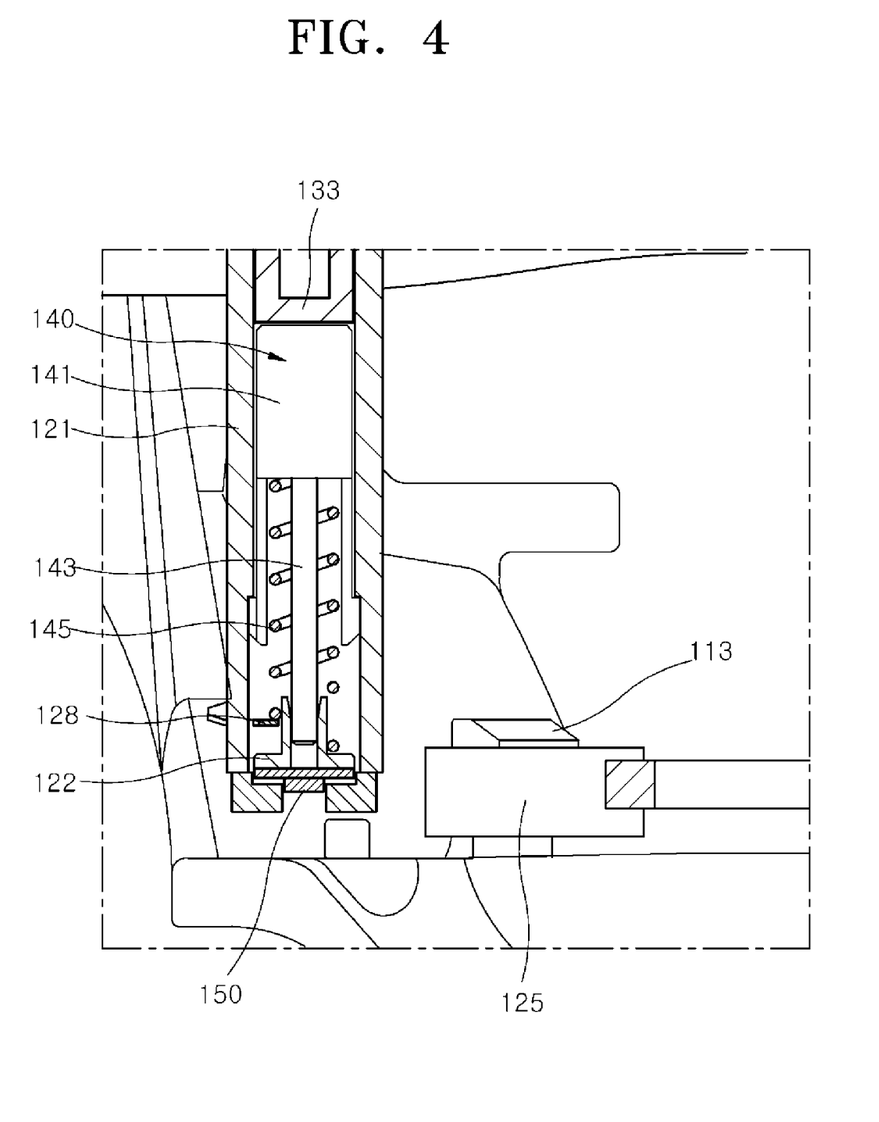
FIG. 4 is a cross-sectional view of a moving contact module and an elastic contact portion in the steering wheel airbag apparatus in accordance with the embodiment of the present invention.
Figure 5:
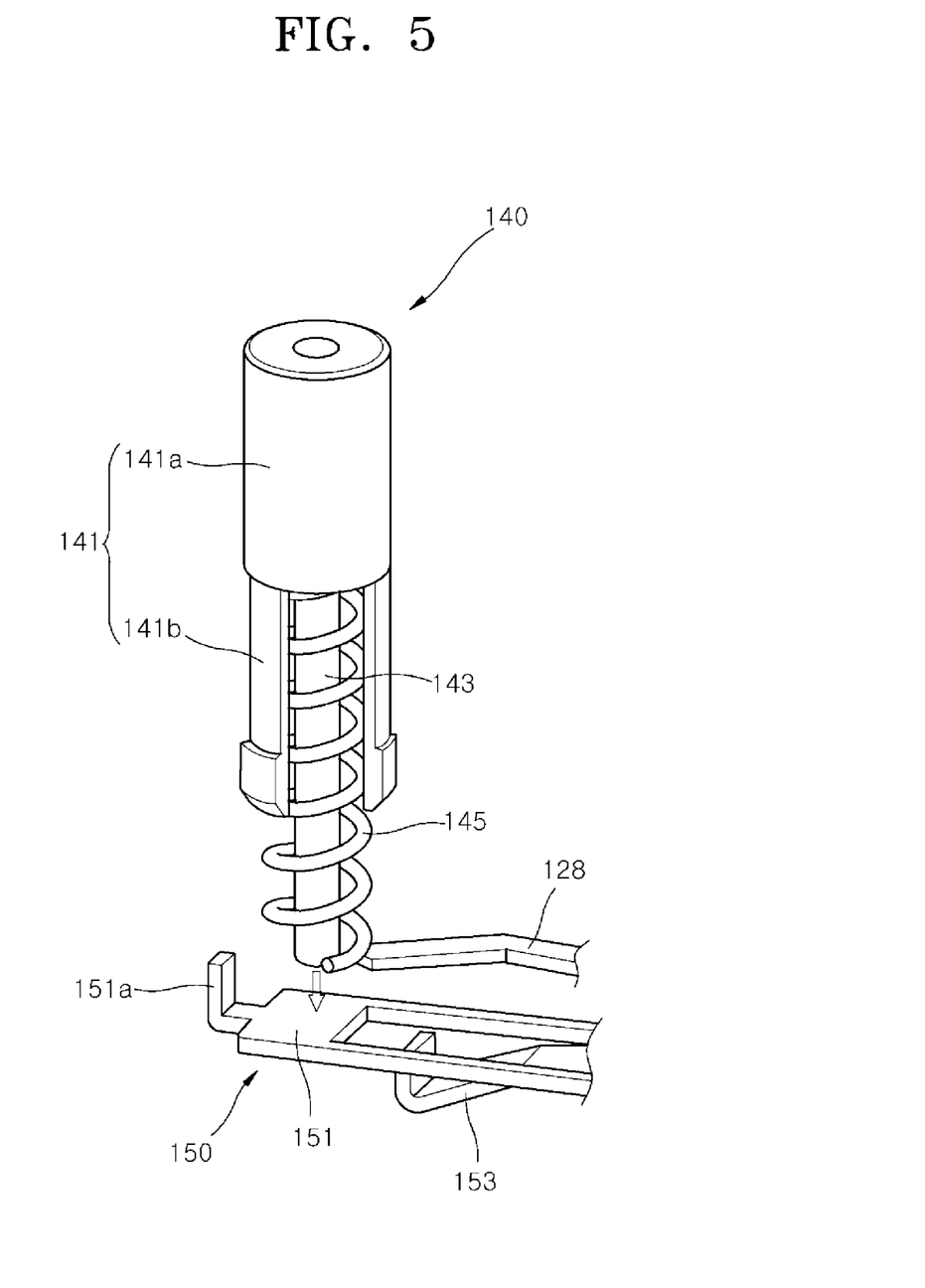
FIG. 5 is a perspective view of the moving contact module and the elastic contact portion in the steering wheel airbag apparatus in accordance with the embodiment of the present invention.
Figure 6:
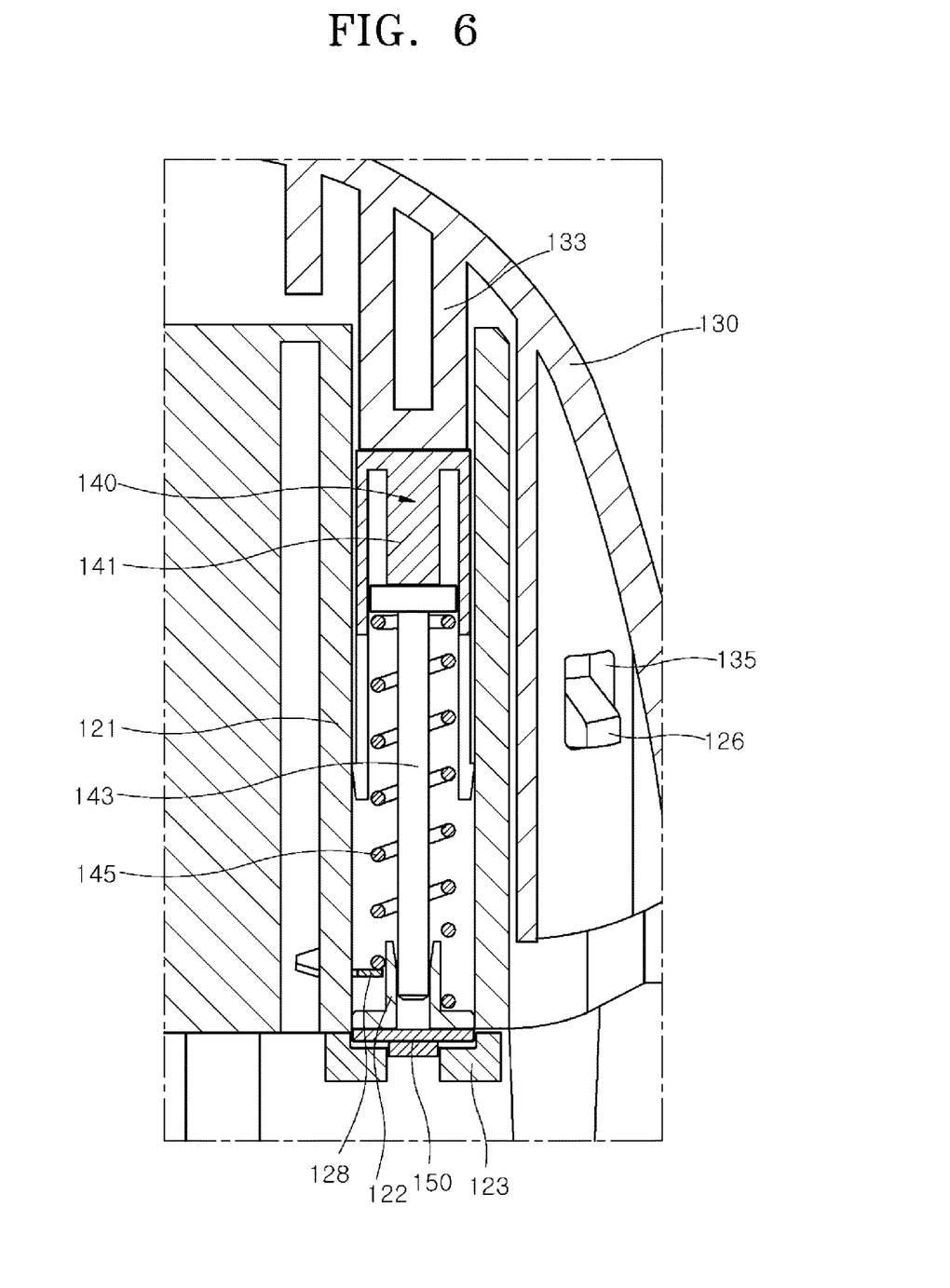
FIG. 6 is a cross-sectional view illustrating a state in which a cover is not pressurized in the steering wheel airbag apparatus in accordance with the embodiment of the present invention.
Figure 7:
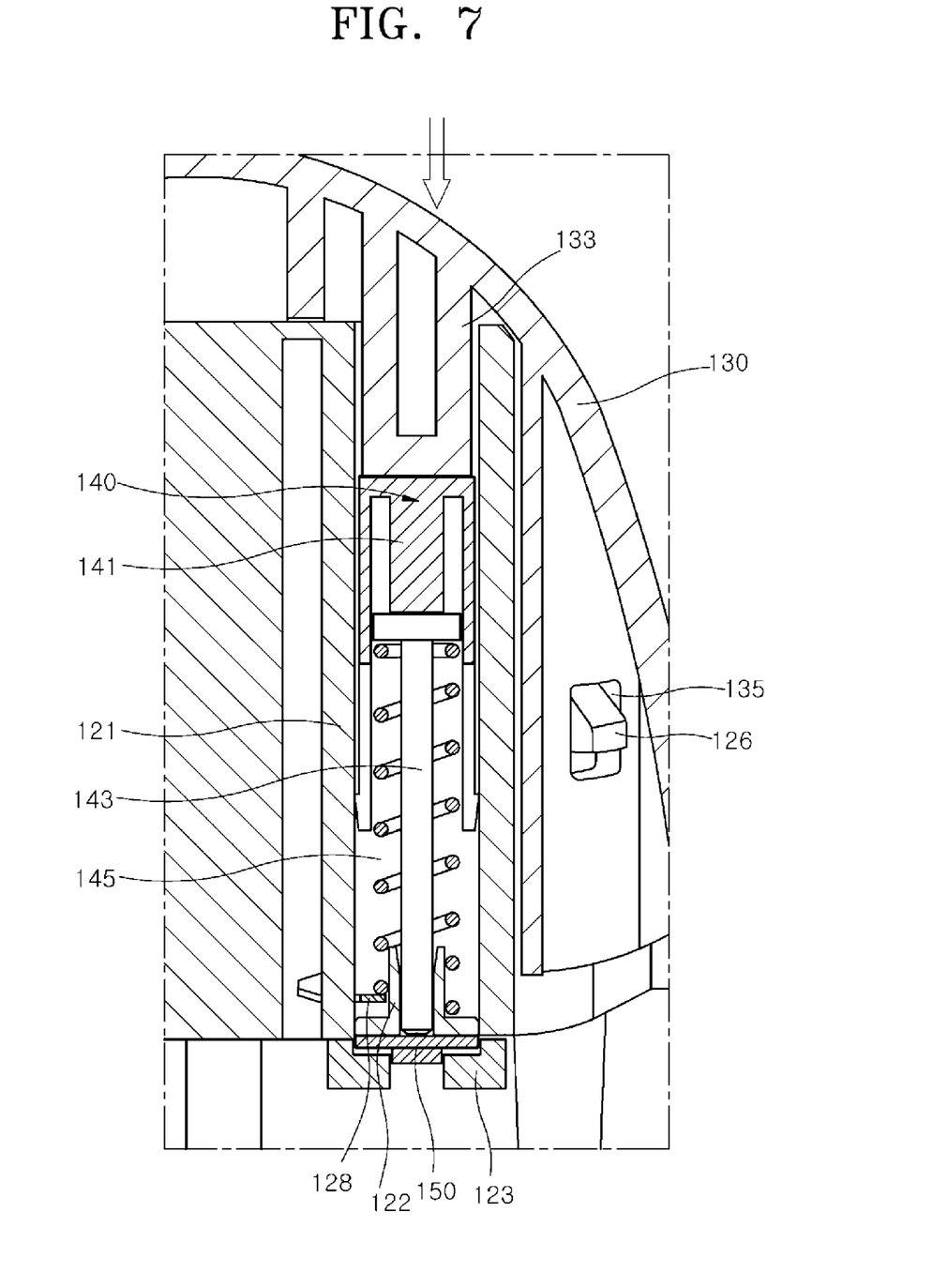
FIG. 7 is a cross-sectional view illustrating a state in which the cover is pressured to connect the moving contact module and the elastic contact portion in the steering wheel airbag apparatus in accordance with the embodiment of the present invention.

FIG. 4 is a cross-sectional view of the moving contact module and the elastic contact portion in the steering wheel airbag apparatus in accordance with the embodiment of the present invention, FIG. 5 is a perspective view of the moving contact module and the elastic contact portion in the steering wheel airbag apparatus in accordance with the embodiment of the present invention, FIG. 6 is a cross-sectional view illustrating a state in which the cover is not pressurized in the steering wheel airbag apparatus in accordance with the embodiment of the present invention, and FIG. 7 is a cross-sectional view illustrating a state in which the cover is pressured to connect the moving contact module and the elastic contact portion in the steering wheel airbag apparatus in accordance with the embodiment of the present invention.

Referring to FIGS. 4 to 7, the moving contact module 140 may be movably installed in the guide pipe 121, moved to one side when pressurized by the cover 130, and connected to the positive electrode. The moving contact module 140 may be connected to the positive wire 128 insert-molded in the mounting plate 120, and thus positively charged. The moving contact module 140 may be installed in each of the guide pipes 121. Since the plurality of moving contact modules 140 are installed, the horn may be driven even though the negative electrode and the positive electrode are not electrically connected to each other in a part of the moving contact modules 140.

The elastic contact portion 150 may be coupled to one side of the guide pipe 121, supported by the negatively charged wheel armature 110, and connected to the negative electrode. When the moving contact module 140 is pressurized by the cover 130 and moved to the one side, the moving contact module 140 may be connected to the elastic contact portion 150. At this time, since the elastic contact portion 150 is connected to the negatively charged wheel armature 110, a separate negative wire for connecting the elastic contact portion 150 to the negative electrode does not need to be installed. Therefore, the structure of the mounting plate 120 and the cover 130 can be simplified, and the number of parts can be reduced. Furthermore, a connector for connecting the negative wire does not need to be installed.

The moving contact module 140 may include a moving guide 141, a moving rod 143 and an elastic member 145.

The moving guide 141 may be movably arranged in the guide pipe 121, and pressurized by the cover 130. At this time, the cover 130 may have a pressurizing boss 133 which is inserted into the guide pipe 121 so as to move the moving guide 141 of the moving contact module 140. The moving guide 141 may include a cylindrical body portion 141a to which the moving rod 143 and the elastic member 145 are inserted and guide pin portions 141b which are extended in parallel to the moving rod 143 from the cylindrical body portion 141a. The guide pipe portions 141b may be arranged at even intervals along the circumferential direction of the cylindrical body portion 141a, and bent toward the center when the cylindrical body portion 141a is inserted into the guide pipe 121. Therefore, the moving guide 141 may be easily inserted into the guide pipe 121.

The moving rod 143 may be arranged in the moving guide 141. An end portion of the moving rod 143 may be forced into the cylindrical body portion 141a of the moving guide 141. The moving guide 141 and the moving rod 143 may be installed in such a manner that the inner surface of the moving guide 141 and the outer surface of the moving rod 143 are isolated from each other. The moving rod 143 may be formed in the shape of a circular rod.

Both sides of the elastic member 145 may be supported by the moving guide 141 and the mounting plate 120, and apply an elastic force to the moving guide 141 such that the moving guide 141 is separated from the elastic contact portion 150. At this time, the elastic member 145 may be inserted between the inner surface of the moving guide 141 and the outer surface of the moving rod 143. The elastic member 145 may be formed in the shape of a coil spring. The elastic member 145 may apply an elastic force in the direction to push the moving guide 141 upward in a state where the elastic member 145 is supported by the mounting plate 120. Thus, when an external force is removed from the cover 130, the cover 130 may be returned to the original position by the elastic force of the elastic member 145.

The guide pipe 121 may have a communication pipe 122 formed at one side thereof, the communication pipe 122 supporting one side of the elastic member 145. One side of the moving rod 143 may be passed through the communication pipe 122, and the elastic contact portion 150 may be installed in the communication pipe 122. The communication pipe 122 may be integrated with the mounting plate 120. The communication pipe 122 may support an end (bottom end) of the elastic member 145. The communication pipe 122 may have a communication hole formed therein, and a part of the elastic contact portion 150 may be exposed through the communication hole. Thus, the moving rod 143 may be connected to the elastic contact portion 150 through the communication pipe 122.

The communication pipe 122 may have a fixing rib 123 formed at one side thereof, such that the elastic contact portion 150 is fitted to the fixing rib 123. The fixing rib 123 may be extended toward the center of the communication pipe 122 such that both sides of the elastic contact portion 150 are fitted and fixed to the fixing rib 123. The fixing rib 123 can be formed in various shapes as long as the fixing rib 123 fixes the elastic contact portion 150 to one side of the communication pipe 122.

The moving guide 141, the moving rod 143 and the elastic member 145 may be formed of a conductive material, and the elastic member 145 may be connected to the positive wire 128. At this time, the positive wire 128 may be insert-molded in the mounting plate 120, and an end of the positive wire 128 may be connected to the elastic member 145 through the guide pipe 121. Thus, since a positive current may flow along the elastic member 145, the moving guide 141 and the moving rod 143 and the moving rod 143 is brought in contact with the elastic contact portion 150, the negative electrode and the positive electrode are electrically connected at the elastic contact portion 150. As the negative electrode and the positive electrode are electrically connected, the horn may be driven.

The elastic contact portion 150 may include a support panel 151 and an elastic panel 153.

The support panel 151 may be coupled to one side of the guide pipe 121 and support the mounting plate 120. At this time, the support panel 151 may support the communication pipe 122 formed at one side of the guide pipe 121. The support panel 151 may be formed in the shape of a rectangular frame. The support panel 151 may have restriction ribs 151a formed at both sides thereof, and the restriction ribs 151a may be inserted and fixed to the communication pipe 122 and the mounting plate 120.

The elastic panel 153 may be inclined and extended from the support panel 151 to the wheel armature 110, supported by the wheel armature 110, and connected to the negative electrode by the negatively charged wheel armature 110. At this time, the elastic panel 153 may be supported by the armature boss 111. Since the armature boss 111 is negatively charged, the elastic contact portion 150 may be negatively charged. The end portion of the elastic panel 153 may be bent toward the support panel 151, and prevent the armature boss 111 from being damaged by the end portion of the support panel 151.

The operation of the steering wheel airbag apparatus in accordance with the embodiment of the present invention will be described as follows.

FIG. 6 is a cross-sectional view illustrating a state in which the cover is not pressured in the steering wheel airbag apparatus in accordance with the embodiment of the present invention, and FIG. 7 is a cross-sectional view illustrating a state in which the cover is pressurized to connect the moving contact module and the elastic contact portion in the steering wheel airbag apparatus in accordance with the embodiment of the present invention.

Referring to FIGS. 6 and 7, when a driver presses the cover 130 while driving a vehicle, the cover 130 may be moved downward by the pressing force. The pressurizing boss 133 of the cover 130 may pressurize the moving guide 141 of the moving contact module 140. As the moving guide 141 is pressurized and moved toward the bottom of the guide pipe 121, the elastic member 145 may be contracted. Thus, since the moving rod 143 is lowered to come in contact with the elastic contact portion 150, the negative electrode and the positive electrode may be electrically connected at the elastic contact portion 150. As the negative electrode and the positive electrode are electrically connected, the horn may be driven When the external force applied to the cover 130 is removed, the moving guide 141 may be moved upward by the restoring force of the elastic member 145. Since the moving guide 141 pushes the pressurizing boss 133 upward, the cover 130 may be lifted to the original position. At this time, as the moving guide 141 is lifted, the moving rod 143 may be isolated from the elastic contact portion 150. Thus, the operation of the horn may be stopped.

When the steering wheel airbag apparatus is separated from the steering wheel, the hook portion 113 of the wheel armature 110 may be detached from the restriction portion 125 of the mounting plate 120. When the hook portion 113 is detached from the restriction portion 125, the elastic contact portion 150 may push the mounting plate 120 upward through the elastic force. Then, since the mounting plate 120 is isolated from the wheel armature 110, the mounting plate 120 may be easily taken out of the mounting plate 120.

Since the elastic contact portion 150 is connected to the negatively charged wheel armature 110, a separate negative wire for connecting the elastic contact portion 150 to the negative electrode does not need to be installed. Thus, the structure of the mounting plate 120 and the cover 130 can be simplified, and the number of parts can be reduced.

The elastic contact portion 150 may apply an elastic force to push the mounting plate 120 upward. Thus, when the restriction of the mounting plate 120 by the hook portion 113 is released, the mounting plate 120 may be isolated from the wheel armature 110 by the elastic contact portion 150. Therefore, the mounting plate 120 may be easily separated from the wheel armature 110. Furthermore, the elastic contact portion 150 may serve as a negative wire and a separation spring for separating the mounting plate 120.

The elastic member 145 of the moving contact module 140 may apply an elastic force to the moving guide 141 so as to push the moving guide 141 and the moving rod 143 toward the cover 130. Thus, when the external force applied to the cover is removed, the cover 130 may be moved upward by the restoring force of the elastic member 145.

Therefore, the cover 130 can be moved to the original position without a separate driving source.

Although embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A steering wheel airbag apparatus comprising:
   a mounting plate seated on a negatively charged wheel armature, and having a guide pipe formed therein;
   a cover coupled to the mounting plate;
   a moving contact module movably installed in the guide pipe, pressurized and moved by the cover, and connected to a positive electrode; and
   an elastic contact portion coupled to the guide pipe, connected to a negative electrode while supported by the negatively charged wheel armature, and connected to the moving contact module as the moving contact module is moved.

2. The steering wheel airbag apparatus of claim 1, wherein the moving contact module comprises:
   a moving guide movably arranged in the guide pipe and pressurized by the cover;
   a moving rod coupled to the moving guide, and connected to the elastic contact portion as the moving guide is moved by the pressurization of the cover; and
   an elastic member of which both sides are supported by the moving guide and the mounting plate, and which applies an elastic force to the moving guide in the direction where the moving guide is isolated from the elastic contact portion.

3. The steering wheel airbag apparatus of claim 2, wherein the moving guide comprises;
   a cylindrical body portion into which the moving rod and the elastic member are inserted; and
   guide pin portions extended in parallel to the moving rod in the cylindrical body portion.

4. The steering wheel airbag apparatus of claim 3, wherein the guide pin portions are arranged at even intervals along the circumferential direction of the cylindrical body portion, and bent toward the center when the cylindrical body portion is inserted into the guide pipe.

5. The steering wheel airbag apparatus of claim 2, wherein the moving guide, the moving rod and the elastic member are formed of a conductive material, and
   the elastic member is connected to a positive wire.

6. The steering wheel airbag apparatus of claim 5, wherein the positive wire is insert-molded in the mounting plate, and the positive wire is connected to the elastic member through the guide pipe.

7. The steering wheel airbag apparatus of claim 2, wherein the guide pipe has a communication pipe formed therein, the communication pipe supporting one side of the elastic member,
   one side of the moving rod is passed through the communication pipe, and
   the elastic contact portion is installed in the communication pipe.

8. The steering wheel airbag apparatus of claim 7, wherein the communication pipe has a fixing rib to which the elastic contact portion is fitted.

9. The steering wheel airbag apparatus of claim 8, wherein the elastic contact portion comprises:
   a support panel coupled to the guide pipe so as to support the mounting plate; and
   an elastic panel inclined and extended toward the wheel armature from the support panel, supported by the wheel armature, and connected to the wheel armature.

10. The steering wheel airbag apparatus of claim 9, wherein the support panel has restriction ribs formed at both sides thereof, respectively, the restriction ribs being inserted and fixed to the communication pipe and the mounting plate.

11. The steering wheel airbag apparatus of claim 1, wherein the cover has a pressurizing boss which is inserted to the guide pipe and pressurizes the moving contact module.

* * * * *